United States Patent
Jongewaard et al.

(10) Patent No.: US 9,880,417 B2
(45) Date of Patent: Jan. 30, 2018

(54) ILLUMINATION LENS FOR LED BACKLIGHTS

(71) Applicants: Seoul Semiconductor Co., Ltd., Ansan-si (KR); InteLED Corp., Huntington Beach, CA (US)

(72) Inventors: Mark Jongewaard, Westminister, CO (US); William A. Parkyn, Huntington Beach, CA (US); David Pelka, Los Angeles, CA (US)

(73) Assignees: Seoul Semiconductor Co., Ltd., Ansan-si (KR); InteLED Corp., Huntington Beach, CA (US)

( * ) Notice: Subject to any disclaimer, the term of this patent is extended or adjusted under 35 U.S.C. 154(b) by 66 days.

(21) Appl. No.: 14/943,685

(22) Filed: Nov. 17, 2015

(65) Prior Publication Data
US 2016/0070141 A1   Mar. 10, 2016

Related U.S. Application Data

(63) Continuation of application No. 13/973,704, filed on Aug. 22, 2013, now Pat. No. 9,255,695.
(Continued)

(51) Int. Cl.
*F21V 13/04* (2006.01)
*G02F 1/1335* (2006.01)
(Continued)

(52) U.S. Cl.
CPC ......... *G02F 1/133606* (2013.01); *F21V 5/04* (2013.01); *F21V 5/048* (2013.01);
(Continued)

(58) Field of Classification Search
CPC ......... G02F 1/133606; G02F 1/133603; G02F 2001/133607; F21V 5/04; F21V 5/048;
(Continued)

(56) References Cited

U.S. PATENT DOCUMENTS

| 7,348,723 B2 | 3/2008 | Yamaguchi et al. |
| 7,674,019 B2 | 3/2010 | Parkyn et al. |

(Continued)

FOREIGN PATENT DOCUMENTS

| JP | 2009-500663 | 1/2009 |
| JP | 2011-023204 | 2/2011 |

(Continued)

OTHER PUBLICATIONS

International Search Report dated Mar. 6, 2014 in International Application No. PCT/US13/56234.
(Continued)

*Primary Examiner* — Bao Q Truong
(74) *Attorney, Agent, or Firm* — H.C. Park & Associates, PLC

(57) ABSTRACT

A light-emitting apparatus having a 16:9 geometry includes light-emitting elements disposed on a first substrate or a second substrate, light flux control members respectively disposed on the light-emitting elements and on the first or second substrate, and a film stack disposed above the light flux control members. Each light flux control member includes a bottom surface section disposed on the first or second substrate, a non-rotationally symmetric input surface section having an inward recess disposed in the bottom surface section at a position directly above one of the light-emitting elements, and a non-rotationally symmetric output surface configured to refract light passing through the input surface section, and to transmit light outside. The light flux control members disposed on the first substrate are spaced 100 mm apart from each other in a first direction, and the light-emitting elements are spaced 23 mm away from the film stack.

5 Claims, 5 Drawing Sheets

Related U.S. Application Data

(60) Provisional application No. 61/692,024, filed on Aug. 22, 2012.

(51) Int. Cl.
  *F21V 5/04* (2006.01)
  *G02B 19/00* (2006.01)
  *F21V 5/08* (2006.01)
  *F21Y 115/10* (2016.01)

(52) U.S. Cl.
  CPC ............... *F21V 5/08* (2013.01); *F21V 13/04* (2013.01); *G02B 19/0014* (2013.01); *G02B 19/0061* (2013.01); *G02F 1/133603* (2013.01); *F21Y 2115/10* (2016.08); *G02F 2001/133607* (2013.01)

(58) Field of Classification Search
  CPC ....... F21V 5/08; F21V 13/04; G02B 19/0014; G02B 19/0061; F21Y 2115/10
  See application file for complete search history.

(56) References Cited

U.S. PATENT DOCUMENTS

| | | | |
|---|---|---|---|
| 7,798,679 B2 | 9/2010 | Kokubo et al. | |
| 8,025,429 B2 * | 9/2011 | Ho | F21V 5/04 257/98 |
| 8,227,969 B2 | 7/2012 | Yamaguchi et al. | |
| 8,328,395 B2 | 12/2012 | Kato et al. | |
| 8,714,783 B2 * | 5/2014 | Lee | G02B 3/08 362/296.06 |
| 8,845,119 B2 | 9/2014 | Iiyama et al. | |
| 2003/0156416 A1 | 8/2003 | Stopa et al. | |
| 2007/0002453 A1 | 1/2007 | Munro | |
| 2009/0116245 A1 | 5/2009 | Yamaguchi | |
| 2010/0165640 A1 | 7/2010 | Lin et al. | |
| 2011/0164426 A1 | 7/2011 | Lee | |
| 2011/0182085 A1 | 7/2011 | Ko et al. | |
| 2011/0317432 A1 | 12/2011 | Lee | |
| 2012/0050889 A1 * | 3/2012 | Lu | F21V 5/04 359/718 |
| 2012/0081614 A1 | 4/2012 | Yamamoto | |
| 2012/0105739 A1 | 5/2012 | Shimizu | |
| 2012/0120343 A1 | 5/2012 | Yamamoto | |
| 2012/0176802 A1 | 7/2012 | Householder et al. | |
| 2012/0268940 A1 | 10/2012 | Sahlin et al. | |
| 2013/0114021 A1 | 5/2013 | Iiyama et al. | |
| 2013/0170208 A1 | 7/2013 | Kuwaharada et al. | |
| 2013/0235590 A1 | 9/2013 | Van Der Sijde et al. | |
| 2014/0009944 A1 | 1/2014 | Fukuda | |
| 2014/0104816 A1 * | 4/2014 | Takasi | G02F 1/133603 362/97.3 |

FOREIGN PATENT DOCUMENTS

| | | |
|---|---|---|
| JP | 2011-198479 | 10/2011 |
| WO | 2011/010488 | 1/2011 |
| WO | 2011/114608 | 9/2011 |

OTHER PUBLICATIONS

Written Opinion dated Mar. 6, 2014 in International Application No. PCT/US13/56234.
Non-Final Office Action dated Jan. 15, 2015 in U.S. Appl. No. 13/973,704.
Final Office Action dated Jul. 22, 2015 in U.S. Appl. No. 13/973,704.
Notice of Allowance dated Oct. 2, 2015 in U.S. Appl. No. 13/973,704.

* cited by examiner

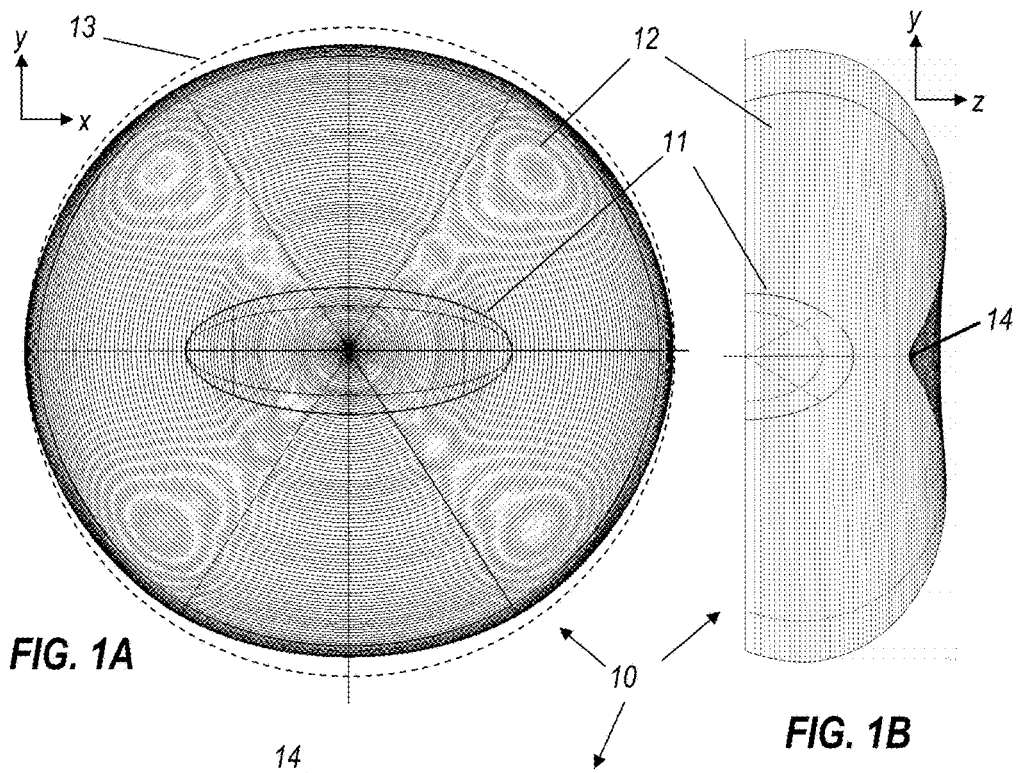
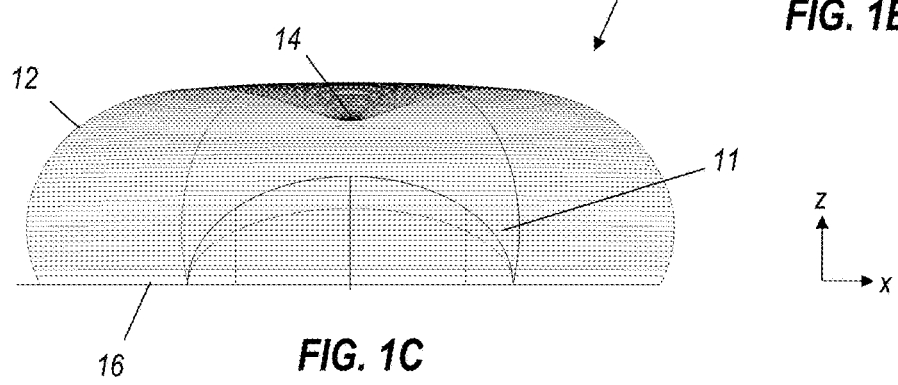
FIG. 1A
FIG. 1B
FIG. 1C

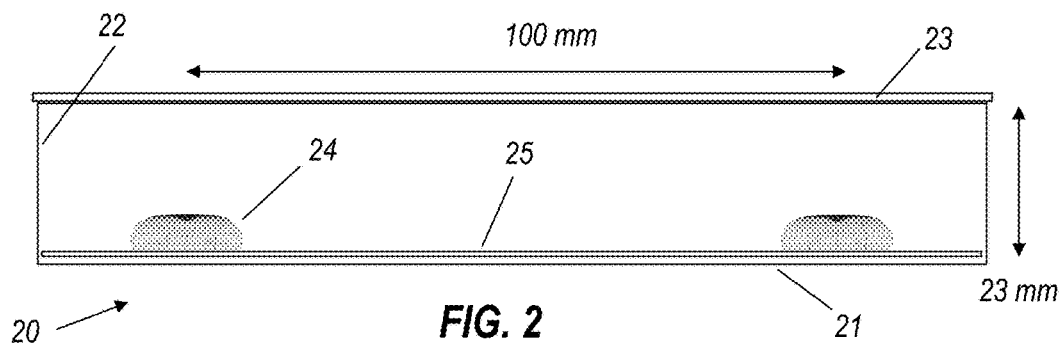
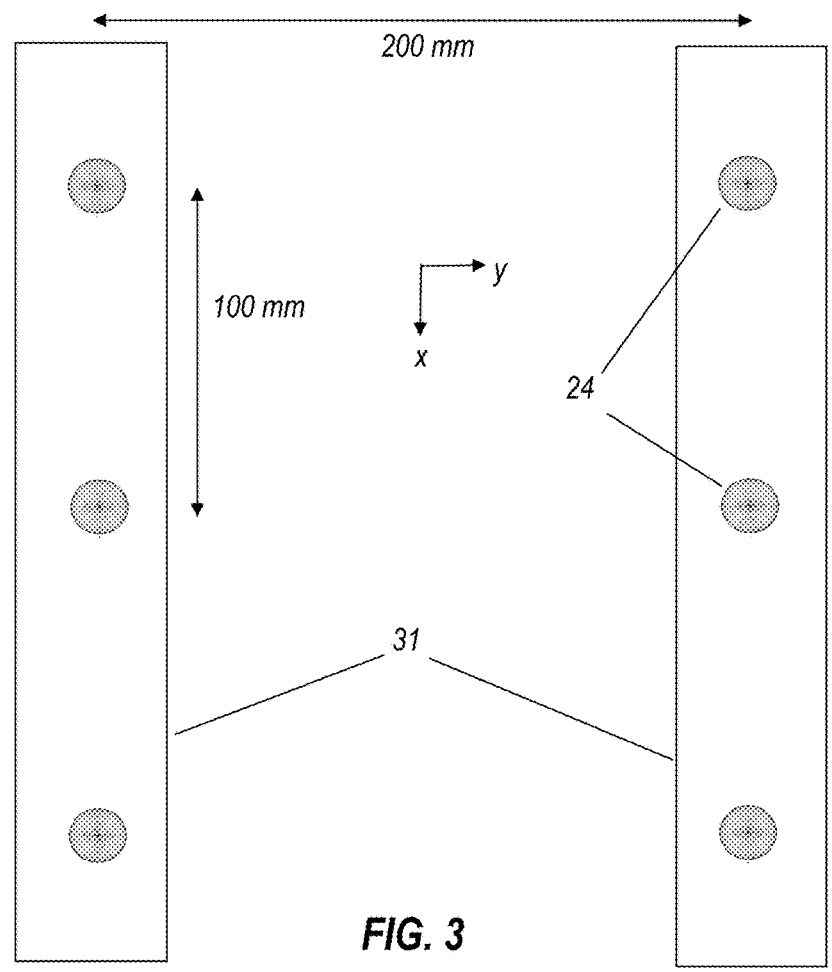

ILLUMINATION LENS FOR LED BACKLIGHTS

CROSS-REFERENCE TO RELATED APPLICATIONS

This application is a continuation of U.S. patent application Ser. No. 13/973,704, filed on Aug. 22, 2013, and claims the benefit of U.S. Provisional Patent Application No. 61/692,024, filed on Aug. 22, 2012, which are both hereby incorporated by reference for all purposes as if fully set forth herein.

BACKGROUND

Field

Exemplary embodiments of the present invention relate to a light emitting apparatus, a planar surface light source apparatus, and the luminous flux control or a deterministic light deviating member more commonly known as an optical lens.

Discussion of the Background

In the past decade, flat-screen televisions have gone from luxury-status to market domination that is so complete that cathode-ray tube (CRT) televisions have ceased production and old CRT sets cannot be given away. While plasma flat-screens are like CRTs in having emissive pixels, the pixels of LCDs are passive, merely acting to rotate the polarization of light passing through them, so that they must be put between two orthogonal polarizers in order for the pixels to act as intensity modulators. Originally, flat-screen LCDs provided this intensity by utilizing waveguide-based backlights that were edge-illuminated by fluorescent tubes. As LEDs rapidly increased in brightness and efficacy, they replaced the fluorescent tubes while retaining the edge-illuminated waveguide. However, waveguides may be thick and heavy for large screen sizes, so that direct-view area backlights comprising hollow light boxes may be desirable because their lights are distributed all across the back of the light box. Direct-view area backlights may have to spread the light out uniformly to eliminate hot spots on the screen just over each LED light source, which is what LEDs without dedicated local lenses may not accomplish.

As LEDs have matured, their increasing power output means that fewer and fewer LEDs may be needed to do any particular illumination task. When area backlights try to use fewer LEDs, especially with the 16:9 proportions of typical high-definition televisions, their illumination geometry may become increasingly difficult to achieve uniform illumination in several ways.

First, locations intermediate between the LEDs are subject to a cosine to the third-power drop-off, which even at 60° off-axis is an 8:1 ratio. This may be over and above the lesser lateral intensity typical of LEDs. Second, an illumination lens may be subject to inevitable scattering, due to imperfections inherent to the injection-molded lens material, that becomes more important as LED luminosity increases. This may superimpose hot spots upon the direct-light pattern which the lens produces, requiring compensation of that pattern with a central dark zone.

In some applications, these adverse factors may be dealt with by increasing the relative size of the illumination lens compared to that of the LED. LCD backlights, however, may be an inch or less in thickness, severely limiting lens size. Also, this thin geometry increases the strength of light scattering by the lens.

LED backlights are used for myriad applications including LCDs, reach-in refrigeration lighting, and general illumination (light fixtures). All of these applications have a throw distance (panel thickness) much less than the spacing between the LED sources. Since LEDs emit in a quasi-Lambertian manner, a diverging lens is used to spread the emitted light out across a large lateral area. This results in the need for a lens that can modify the forward emitting angular distribution of the LED source into a mostly side-emitting angular distribution. The conventional art has focused almost exclusively on solutions with rotational symmetry. While some of these solutions predict near ideal uniformity in one dimension, they are fundamentally limited by étendue, specifically its skewness, from achieving near ideal uniformity in two dimensions.

In LED backlights, the circuit boards holding the LEDs may be separated by a span greater than the pitch of the LEDs on the board. This may require the illumination lens to produce an asymmetric or rectangular pattern, which adds further difficulties due to the topological incompatibility of the nearly round pattern of the LED versus how light must be horizontally deflected towards the long end of the rectangle.

The array of illumination lenses may superimpose their patterns for intermediate locations, but may create a potential deficit of illumination around the edge of the backlight. The light box may include a specular mirror or 45° beveling around its edges, but for cost reasons this may be impractical. Backlights may employ the 45° beveling around the perimeter, which will dictate how few LEDs can be used and still attain illuminance uniformity.

The conventional art discloses how to construct a surface light source device using a plurality of LEDs as the lighting means for backlighting an LCD monitor for use in personal computers, LCD television sets, tablet displays, as well as for smart phones. U.S. Pat. No. 7,798,679 discloses an example of this architecture. The surface light source device taught therein uses a plurality of LEDs with lenses designed to deviate the light emitted from the LEDs in a deterministic manner; moreover, these lighting elements are situated in a planar array having substantially the same shape as the LCD panel that it is to illuminate. This surface light source device then illuminates the LCD device from the LCD's back surface side.

The '679 patent goes on to disclose that when one deviates the light emitted from the LEDs in the 50°-70° range in order to achieve good uniformity on the LCD screen, one may be confronted by unwanted Fresnel reflections at the base of and interior to the lens outer perimeter. This may lead to secondary bright sources that cause non-uniformity in the LCD backlight display and can be compensated to a certain extent by incorporating a faceted structure to randomly scatter this unwanted light from bottom surface of the lens.

U.S. Pat. No. 8,227,969 considers integrating various types of light scattering bottom surface features and how to construct the faceted bottom surface of flux controlling and light diverting lenses. Convex and concave facets of linear and diagonal geometries are modeled as well as pyramidal scattering facets, including rough etched surfaces on these various facet types. The '969 patent discloses that without an effective diffusing bottom of the lens feature, refractive lenses cannot yield good LCD screen uniformity.

U.S. Pat. No. 8,328,395 discloses the importance of the size and placement of lens leg attachments to a printed circuit board (PCB) along with the facet treatment to defeat strong Fresnel reflections. The '395 patent discloses strategically placing leg attachments to very specific spatial positions and employing those legs as optical conductors to remove some of the unwanted Fresnel reflections, while even including blackening these legs to increase unwanted light absorption, for axial-symmetric lens shapes.

SUMMARY

Exemplary embodiments of the present invention provide a non-axial symmetric lens together with a non-axial symmetric interior cavity to achieve excellent LCD screen uniformity even for panels with 16:9 screen geometries.

Additional features of the invention will be set forth in the description which follows, and in part will be apparent from the description, or may be learned by practice of the invention.

An exemplary embodiment of the present invention discloses an illumination lens. The illumination lens includes an internal surface configured to intercept light emitted by a light source, wherein the internal surface comprises an arch-shaped non-rotationally symmetric, elongated horizontal cross-section. The illumination lens also includes an external surface comprising a central cusp, the external surface extending laterally with non-axially-symmetrical profiles in different horizontal directions, the non-axially-symmetric profiles being elliptical with respect to a tilted major axis of the illumination lens.

An exemplary embodiment of the present invention also discloses light-emitting apparatus including a light emitting element disposed on a substrate and a light flux control member disposed on the light emitting element. The light flux control member includes a bottom surface section disposed on the substrate, a non-rotationally symmetric input surface section including an inward recess disposed in the bottom surface section at a position directly above the light emitting element, a non-rotationally symmetric output surface configured to refract light passing through the input surface section, and to transmit light outside, and at least two leg sections protruding from the bottom surface section and contacting the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1A is a top view of an exemplary embodiment of the present invention showing a non-axial symmetric shape of a light emission outer surface.

FIG. 1B is a side view of the exemplary embodiment in the x-direction and showing a cross-sectional view of an inner cavity when viewed from the x-direction.

FIG. 1C is a side view of the exemplary embodiment in the y-direction and showing the non-axial symmetry of the inner cavity.

FIG. 2 is a side view of two lenses from a portion of a light box according to an exemplary embodiment of the present invention.

FIG. 3 is a top view of the rectangular array of lenses in the light box laid out for an asymmetric lens format according to the present exemplary embodiment.

DETAILED DESCRIPTION OF THE ILLUSTRATED EMBODIMENTS

Figure 1D:
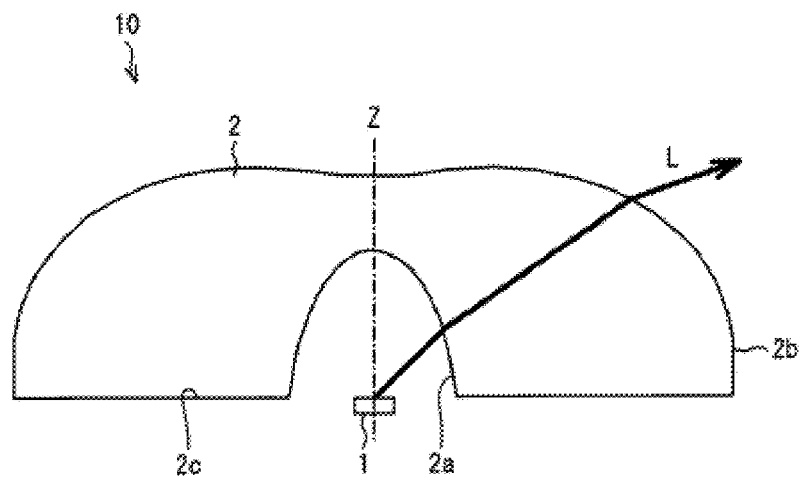
FIG. 1D is a cross-sectional view of FIG. 1A looking along the +x direction and showing the refraction at the entrance surface and exit surface that a light ray emitted from an LED in the exemplary embodiment undergoes.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

A better understanding of the features and advantages of the present invention will be obtained by reference to the following detailed description of the invention and accompanying drawings, which set forth illustrative embodiments in which the principles of the invention are utilized.

Illumination lenses for LED direct-view backlights can be categorized as short-throw illuminators, which use a lens that has minimal intensity on-axis and its greatest intensity at high lateral angles. A short-throw lens must accordingly have minimum central thickness, having an interior surface with an arch-like shape that surrounds the LED and an exterior surface that extends outward to generate the lateral lens thickness that maximizes lateral intensity. The lenses presented in the conventional art are rotationally symmetric, with a profile being swept about a central axis to generate the solid. These lenses typically have negative optical power at their center with either a concave-plano, concave-concave, or plano-concave lens shapes. In order to achieve greater uniformity and to introduce additional degrees of freedom, the lens according to exemplary embodiments of the present invention breaks rotational symmetry. Specifically, the lens profiles in the ordinal and diagonal directions are independent. The result, in the application of backlights, is a somewhat "square" lens that directs a portion of light from the ordinal directions to the diagonals.

A rectangular lens pattern may be produced using a free-form lens that is not circularly symmetric, so that it can throw more light towards the long end of the rectangle and less towards its short end. In exemplary embodiments of the present invention the interior surface is more out of round than the exterior surface, and the exterior surface has a central cusp to produce a negative lens and to reduce the on-axis output and compensate for the stray-light hot-spot just above the lens. Exemplary embodiments of the present invention relate to a 2:1 rectangle, for 200 mm PCB board separation and 100 mm on-board separation of the lenses (i.e. LEDs) arrayed inside a light box with only an inch in thickness, with the inside top diffuser being only 23 mm above the LED.

A light emitting device according to an exemplary embodiment of the present invention is described below with reference to FIGS. 1A through 1E.

FIG. 1A is a top view of a light flux controlling member, or more simply termed, illumination lens 10, comprising a horizontally (i.e., x-axis) elongated inner cavity with a vertically arched internal surface 11, and external convex surface 12, which is much larger. Dotted circle 13 has a diameter of 18 mm and shows how surface 12 is a non-rotationally symmetric outer surface. The inner surface 11 may have a length to width ratio at the base thereof of about 2.5:1. The external surface 12 may be horizontally elongated in the same direction as the elongated cross-section of the inner surface 11 and have a length to width ratio of about 16:15.

The light emitting device according to the present exemplary embodiment illustrated in FIG. 1A includes a light emitting element, typically an LED located at the intersection of the X-Y axis (not shown in FIG. 1A) and a light illumination lens 10 arranged to surround and cover the LED. A direction of light axis Z (a reference light axis) is not shown but assumed to be along the Z axis of the right-handed coordinate system XYZ and assumed to be coming vertically out of the center of FIG. 1A and perpendicular to the page as shown in FIG. 1D.

Furthermore, the illumination lens 10 has a non-rotationally symmetric shape with respect to the light axis Z and moreover, the central inner cavity which receives radiation from the LED is highly asymmetric. The illumination lens 10 refracts the light emitted from the LED in a direction more parallel to a direction perpendicular to the light axis Z so as to redirect the light coming from the LED in a more useful direction as an LED backlight for an LCD screen.

The illumination lens 10 is a member for changing the direction of light emitted from the LED. However, the light flux controlling member 10 may be made from a transparent material having a refractive index in the range of 1.45 to 1.65. In addition, the illumination lens 10 may be made from a transparent resin material or a transparent glass. Examples of such transparent resin material are polymethylmethacrylate (acrylic or PMMA) having a refractive index of 1.49, polycarbonate (PC) having a refractive index of 1.59, a proxy resin (EP), and the like.

Now turning our attention to FIGS. 1B and 1C, we see that the illumination lens 10 has a light incoming surface 11 as an internal surface, a light outgoing surface 12 as an external surface, a central cusp 14, and a bottom surface 16 that interconnects the light incoming surface 11 with a light outgoing surface 12 and central cusp 14. The illumination lens 10 has an empty highly-asymmetric cavity space therein and the LED is disposed in the empty cavity space. The LED is a member that emits light into its surroundings with the light axis Z as the center of its light emission. The LED is not particularly limited, and a conventional LED chip may be used as a light-emitting element.

FIG. 1B is a cross sectional view taken along the −y and +y axis of lens 10, also showing internal surface 11 and external surface 12 with central cusp 14.

FIG. 1C is a cross sectional view taken along the −x and +x axis, looking in the +y-direction, of illumination lens 10, also showing the highly asymmetric internal surface 11 and external surface 12 with central cusp 14 as compared to FIG. 1B. FIGS. 1B and 1C illustrate cross-sectional views of the light emitting device in accordance with the present exemplary embodiment. According to the present exemplary embodiment, a light direction is changed on both the internal surface 11, external surface 12, and central cusp 14, so it is possible to form external surface 12 in a convex shape (i.e., the central cusp 14) in the vicinity of light axis Z. The central cusp 14 may be disposed at a height about ⅚ of the maximum height of the external surface 12, for instance. The internal surface 11 may have a central apex height that is about 55% of a maximum height of the illumination lens 10.

FIG. 1D is a view of illumination lens 10, looking along the +x axis. Here LED 1 emits a photon that is refracted at surface 2a and then travels through the lens 10 until it refracts again at surface 2b. Bottom surface 2c connects the inner cavity 2a with the outer surface 2b.

Figure 1E:
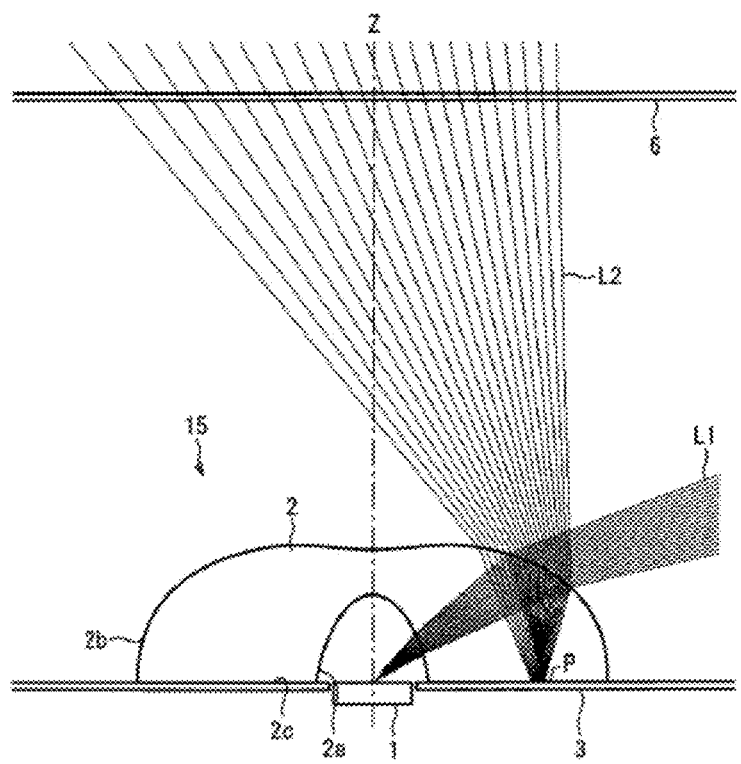
FIG. 1E is the same view as in FIG. 1D but shows the Fresnel reflections that occur internal to the lens when the beam of light rays leaving the LED exceeds about 50°.

FIG. 1E is a view of illumination lens 15, showing a beam of photons leaving the LED 1 inclined at an angle of about 50°+, and shows the strong Fresnel reflection which is sent to the bottom of surface 2c where it reflects at point P and passes back through the illumination lens 15 and emerges from top surface 2 and strikes top diffuser 6, causing a secondary source of light which may make forming a uniform distribution of light on the diffuser 6 difficult. To counter this effect FIG. 1E shows a surface 3 which may be a roughened surface and/or a multi-faceted pyramidal diffuser that randomizes the light reflected from point P, for instance. Surface 3 and surface 2c may also be the same surface, and this diffusing structure may be included in injection mold tooling for forming the lens 15.

FIG. 2 is a side view of light box 20, a subsection including bottom surface 21 and lateral walls 22 coated with a highly reflective diffuse white material with diffuse reflectivity in excess of 95% and at the extreme ends of the light box lateral walls 22 will be inclined at a 45° bevel. The top surface film stack 23 is horizontally disposed, and may include a lower diffuser sheet, a prism sheet with horizontally (x-axis) aligned prisms, and a top most polarization reflecting layer. The film stack diffusely reflects more than half the upward going light, back down to the white bottom surface 21, which in turn reflects it back upwards, improving the overall uniformity of the light going up out of the film stack 23. Lenses 24, substantially similar to illumination lenses 10 as described above, are situated 100 mm apart on circuit board 25, along the x-direction, which is the horizontal, long axis of a high-definition television screen. Also note from FIG. 2 that the long axis of the asymmetric internal cavity is oriented to be perpendicular to the 200 mm direction.

FIG. 3 shows the spatial arrangement of the lenses 24 as shown in FIG. 2, note that for a typical 32 inch LCD television set whose surface area is approximately 700 mm by 400 mm, there may be six lenses 24 spanning the long direction and three rows of lenses spanning the 400 mm direction. It should be noted that in the fabrication of these backlight panels that the PCB material may be a dark green or black color to help absorb unwanted Fresnel reflections from the bottom of the lenses or in some instances the lenses can be coated on the bottom surface with a highly absorbing black paint. Moreover, a large sheet of white or highly reflecting diffuse material with predetermined cutout holes will overlay the PCBs 31 and allow the lenses 24 to penetrate therethrough. The lenses 24 have two or more legs (not shown) extending from the bottom thereof and into the PCB substrate, to affix the lenses 24 permanently in place with respect to the PCB 31 and ensure that the non-rotationally symmetrical inner cavity is oriented correctly in order to optimally disperse the rectangular light emission pattern from the lenses 24.

Figure 4:
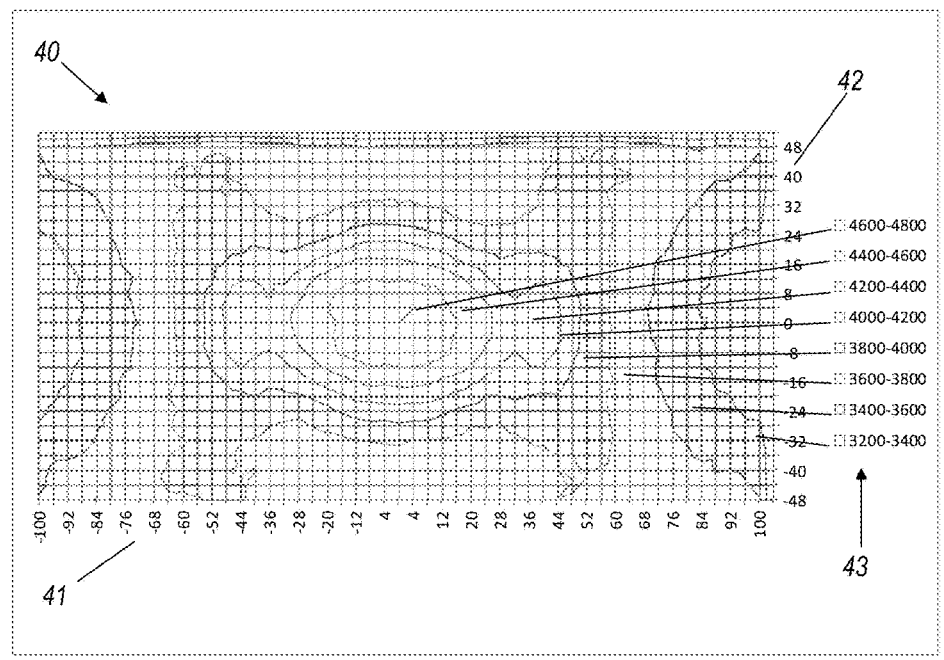
FIG. 4 is a contour map of output illumination without the smoothing effect of the micro-pyramidal faceted structure on the bottom surface of a lens according to an exemplary embodiment of the present invention.

FIG. 4 shows a perspective view of contour map 40, showing the lux results of a 10 million-ray simulation in the commercial ray-tracing package Photopia, for the illumination lens 10 shown in FIG. 1 and a 125-lumen LED manufactured by Seoul Semiconductor Co., Ltd. This graph depicts the lux levels attained atop the film stack 23 of the light box 20 shown in FIG. 2. The x-axis 41 and y-axis 42 are graduated in millimeters. Legend 43 shows the various illumination lux-zones for a lens located at the center. This contour map 40 is prior to the smoothing that a bottom surface diffuser or faceted pyramidal array will impart to significantly improve illumination uniformity.

Figure 5:
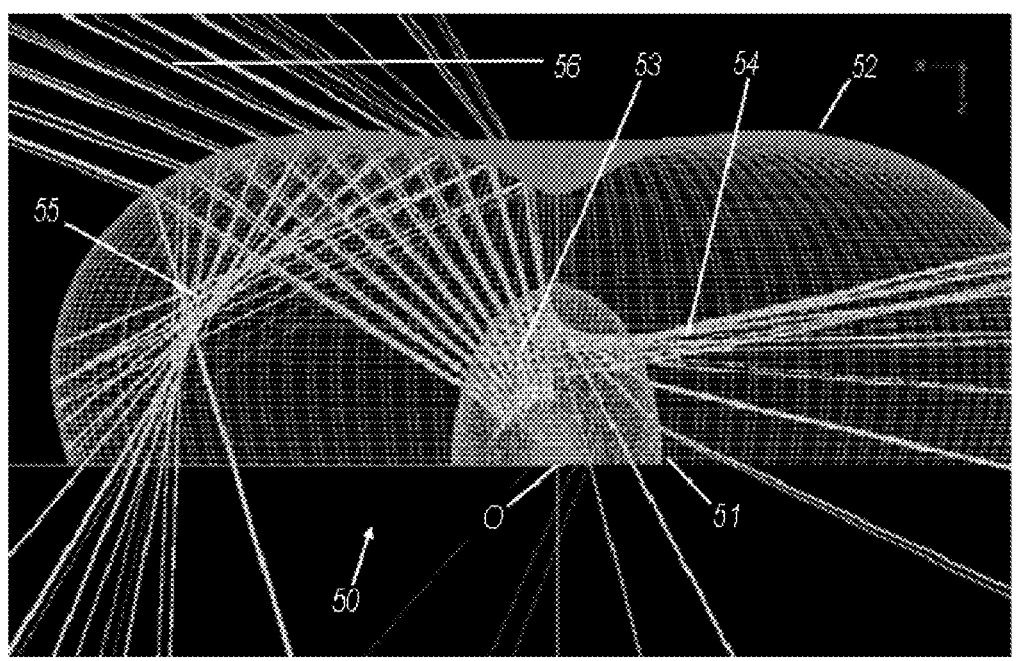
FIG. 5 shows Fresnel-reflected rays both interior to and exterior to the lens according to an exemplary embodiment of the present invention, when viewed from along the +x-direction.

FIG. 5 is a ray diagram depicting the behavior of Fresnel-reflected rays. Lens 50, substantially the same as illumination lens 10 of FIG. 1, has interior surface 51 and exterior surface 52. Diagnostic radial ray fan 53 comprises rays that proceed from the coordinate origin O (the position of an LED chip) to interior surface 51, whence a portion of their flux is reflected to become Fresnel rays 54. These rays are deflected outwards to proceed to exterior surface 52, whence a portion of their flux is reflected to become Fresnel rays 55, while most of that flux is deflected further outwards to become direct illumination rays 56. Not shown in FIG. 5 is how both sets of Fresnel rays can produce unwanted additions to the illumination pattern produced by rays 56. The Fresnel rays will reflect off the circuit board (as in FIG. 1E) and become a localized source with a short-range pattern close to the lens. This is the reason for the central cusp 14 at the top center of the lens, since the direct illumination pattern has a central dark zone that compensates for the excess central illumination by the Fresnel rays. The lens 50 is constructed using the method as taught in U.S. Pat. No. 7,674,019, and is hereby included in its entirety by reference.

The narrow light-box geometry shown in FIG. 2 results in large lateral deflections by the lens surfaces, which leads to stronger Fresnel rays. The 200 mm board spacing shown in FIG. 3 gives rise to very large incidence angles of rays hitting the film stack 23 of FIG. 2. Strong lateral intensity can be obtained by sufficient lens height, but such height is cramped by the desired thinness of the light box 20, making the height of the film stack 23 above the LEDs, relative to the lens 24 separation, a very important parameter. Making the lens 24 larger than the size disclosed according to exemplary embodiments herein may become self-defeating, due to the closeness of the film stack target.

Exemplary embodiments of the present invention disclose using non axial-symmetric lens cavities as well as outer lens shapes. When these inner and outer lens surfaces are coordinated the emitted radiation pattern can more closely approach the desired 16:9 geometry for the newer types of LCD displays. In addition, fewer LEDs may need to be used to do the same job that rotationally symmetric lenses can obtain, which allows for lower manufacturing costs and savings in fewer LEDs and lenses when the unique non-rotationally symmetric (free-form or anamorphic) architecture according to the exemplary embodiments of the present invention is employed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light-emitting apparatus having a 16:9 geometry, comprising:
   light-emitting elements disposed on a first substrate or a second substrate;
   light flux control members respectively disposed on the light-emitting elements and on the first or second substrate; and
   a film stack disposed above the light flux control members,
   wherein each light flux control member comprises:
      a bottom surface section disposed on the first or second substrate;
      a non-rotationally symmetric input surface section comprising an inward recess disposed in the bottom surface section at a position directly above one of the light-emitting elements; and
      a non-rotationally symmetric output surface configured to refract light passing through the input surface section, and to transmit light outside,
   wherein the light flux control members disposed on the first substrate are spaced 100 mm apart from each other in a first direction, and
   wherein the light-emitting elements are spaced 23 mm away from the film stack.

2. The light-emitting apparatus of claim 1, wherein the light flux control members disposed on the first substrate are spaced 200 mm apart from the light flux control members disposed on the second substrate, in a second direction perpendicular to the first direction.

3. The light-emitting apparatus of claim 2, wherein:
   the 16:9 geometry light-emitting apparatus is configured to be disposed in a display device having a surface area of 700 mm by 400 mm; and
   the light-emitting apparatus comprises six light flux control members disposed on each of the first and second substrates.

4. The light-emitting apparatus of claim 3, wherein:
   the light-emitting elements each have a luminous flux of 125 lumens; and
   the light-emitting apparatus is configured to have a peak illuminance in the range of 4600 to 4800 lux at a center point of each of the light flux control members, measured from above the film stack.

5. A light flux control member, comprising:

an internal surface configured to intercept light emitted by the light emitting element, wherein the internal surface comprises an arch-shaped non-rotationally symmetric, elongated horizontal cross-section; and an external surface comprising a central cusp, the external surface extending laterally with non-axially-symmetrical profiles in different horizontal directions, the non-axially-symmetric profiles being elliptical with respect to a major axis of the light flux control member, wherein the overall shape of the circumference of the light flux control member is substantially elliptical, and wherein a long axis of the internal surface is parallel to a long axis of the external surface.

\* \* \* \* \*